United States Patent
Wu

(10) Patent No.: US 11,715,176 B2
(45) Date of Patent: Aug. 1, 2023

(54) FOVEATED RENDERING METHOD AND SYSTEM OF VIRTUAL REALITY SYSTEM BASED ON MONOCULAR EYEBALL TRACKING

(71) Applicant: QINGDAO PICO TECHNOLOGY CO., LTD., Qingdao (CN)

(72) Inventor: Tao Wu, Shandong (CN)

(73) Assignee: Qingdao Pico Technology Co, Ltd., Qingdao (CN)

( * ) Notice: Subject to any disclaimer, the term of this patent is extended or adjusted under 35 U.S.C. 154(b) by 0 days.

(21) Appl. No.: 17/816,408

(22) Filed: Jul. 30, 2022

(65) Prior Publication Data

US 2022/0366529 A1 Nov. 17, 2022

Related U.S. Application Data

(63) Continuation of application No. PCT/CN2021/116750, filed on Sep. 6, 2021.

(30) Foreign Application Priority Data

Mar. 30, 2021 (CN) .......................... 202110340440.1

(51) Int. Cl.
*G06T 3/40* (2006.01)
*G06T 7/70* (2017.01)
(Continued)

(52) U.S. Cl.
CPC ................ *G06T 3/40* (2013.01); *G06F 3/013* (2013.01); *G06T 7/70* (2017.01); *G06T 11/00* (2013.01);
(Continued)

(58) Field of Classification Search
CPC ... G06T 3/40; G06T 7/70; G06T 11/00; G06T 2207/10048; G06T 2207/30201; G06F 3/013; H04N 5/2256; G06V 40/193
See application file for complete search history.

(56) References Cited

U.S. PATENT DOCUMENTS

| 10,984,756 B2* | 4/2021 | Tall .......................... H04N 19/17 |
| 11,347,056 B2* | 5/2022 | Robbins ............. G02B 27/0093 |

(Continued)

FOREIGN PATENT DOCUMENTS

| CN | 106445167 A | 2/2017 |
| CN | 106686365 A | 5/2017 |

(Continued)

OTHER PUBLICATIONS

Search Report dated Nov. 30, 2021 for PCT Application No. PCT/CN2021/116750.

(Continued)

*Primary Examiner* — Jwalant Amin

(57) ABSTRACT

A foveated rendering method of a Virtual Reality (VR) system based on monocular eyeball tracking is provided. A first monocular mapping position, corresponding to a monocular eyeball of a user, on a display screen of the VR system is obtained, and then an Inter Pupillary Distance (IPD) corresponding to a binocular pupil distance of the user is obtained, so as to calculate a second monocular mapping position, corresponding to the other monocular eyeball of the user, on the display screen of the VR system according to the IPD and the first monocular mapping position. Then, main rendering regions are determined by taking the first monocular mapping position and the second monocular mapping position as circle centers and preset thresholds as radiuses respectively. High-resolution main rendering is performed in the main rendering regions.

20 Claims, 2 Drawing Sheets

(51) Int. Cl.
*G06F 3/01* (2006.01)
*G06T 11/00* (2006.01)
*H04N 23/56* (2023.01)

(52) U.S. Cl.
CPC ... *H04N 23/56* (2023.01); *G06T 2207/10048* (2013.01); *G06T 2207/30201* (2013.01)

(56) References Cited

U.S. PATENT DOCUMENTS

| | | | |
|---|---|---|---|
| 11,360,556 B2 * | 6/2022 | Cheng | G09G 5/37 |
| 11,435,577 B2 * | 9/2022 | Balachandreswaran | |
| | | | G02B 27/0172 |
| 11,534,063 B2 * | 12/2022 | Zhang | G06T 7/73 |
| 2017/0041596 A1 * | 2/2017 | Park | H04N 13/305 |
| 2017/0091549 A1 * | 3/2017 | Gustafsson | G06F 3/04845 |
| 2018/0143683 A1 * | 5/2018 | Kang | G06F 3/04815 |
| 2020/0372678 A1 * | 11/2020 | Farmer | G06F 3/012 |
| 2023/0023903 A1 | 1/2023 | Li et al. | |

FOREIGN PATENT DOCUMENTS

| | | | |
|---|---|---|---|
| CN | 106980983 A | 7/2017 | |
| CN | 107317987 A | 11/2017 | |
| CN | 108604116 A | 9/2018 | |
| CN | 109960035 A | 7/2019 | |
| CN | 110855972 A | 2/2020 | |
| CN | 111491159 A | 8/2020 | |
| CN | 111556305 A | 8/2020 | |
| CN | 111988598 A | 11/2020 | |
| CN | 113177434 A | 7/2021 | |
| WO | WO-2016124668 A1 * | 11/2016 | A61B 3/113 |

OTHER PUBLICATIONS

First Office Action dated Aug. 17, 2022 in CN No. 202110340440.1, English translation (18 pages).

* cited by examiner

FOVEATED RENDERING METHOD AND SYSTEM OF VIRTUAL REALITY SYSTEM BASED ON MONOCULAR EYEBALL TRACKING

CROSS REFERENCE

This application is a continuation of PCT International Application No. PCT/CN2021/116750 filed on Sep. 6, 2021, which claims priority to Chinese Application No. 202110340440.1 filed on Mar. 30, 2021, the entirety of which is herein incorporated by reference.

TECHNICAL FIELD

The present disclosure relates to the technical field of Virtual Reality (VR), and in particular to a foveated rendering method and system of a VR system based on monocular eyeball tracking.

BACKGROUND

With the progress of science and technology and the diversified development of market demands, VR systems are becoming more and more popular and have been applied in many fields, such as computer games, health and safety, industrial and educational training. As a few examples, mixed VR systems are being integrated into all aspects of life such as mobile communication devices, gaming machines, personal computers, movie theaters, theme parks, university laboratories, student classrooms, and hospital exercise rooms.

In general, VR is a form of reality that is adjusted in some manner prior to being presented to a user, and may include VR, Augmented Reality (AR), Mixed Reality (MR), or some combinations and/or derivative combinations of VR, AR, MR and the like.

A typical VR system includes one or more devices configured to present and display content to a user. For example, a VR system may include a Head Mounted Display (HMD) worn by a user and configured to output VR content to the user. At present, a VR system configured as an integrated device is popular. That is, various hardware devices such as a mobile computing processing unit and an image graphic renderer are integrated in the integrated device. At present, the integrated VR device is applied and popularized in many fields and scenarios, the requirements on quality parameters such as image definition of rendered contents presented by the integrated VR device in some scenarios are relatively high, and large challenges are brought to the processing capability and rendering capability of a mobile end of the integrated VR device.

At present, several solutions in different directions are provided. (1) Resources occupied by computing and rendering of virtual contents are reduced by reducing the display resolution of an entire head mounted integrated VR device. (2) By rendering the virtual contents of a part of regions in the center of a display screen at high resolution, and rendering and computing processing the virtual contents of other regions at reduced resolution, the computing resources and rendering resources of the virtual contents are optimized. (3) Eyeball fixation positions corresponding to binocular eyeball positions on a display screen region are obtained through an eyeball tracking technology, contents of regions corresponding to the eyeball fixation positions are rendered at high resolution, and contents of other regions are rendered and processed at low resolution.

According to the above solutions (1) and (2), negative influence is brought to the display definition of virtual contents presented by the integrated VR device to a certain extent, and the user experience is greatly influenced. In the solution (3), the problem of display definition of virtual contents of an eyeball fixation region of a user is solved to a certain extent. However, according to an eyeball tracking technology which is mainstream on the integrated VR device, two eyeball tracking modules need to be respectively arranged on left and right eye positions of a screen of an integrated VR device, and the same light source needs to be adopted in the two eyeball tracking modules, so that when in calibration or use, light rays emitted by the light sources in the two eyeball tracking modules are likely to interfere with each other, especially for a user wearing myopia glasses, computing result errors are increased, and the position accuracy of eyeball tracking is influenced.

Therefore, there is an urgent need for a foveated rendering method and system of a VR system based on monocular eyeball tracking, which can effectively avoid the problem that light sources of the two eyeball tracking modules are likely to interfere with each other in calibration or use, and can track regions of both eyes of a user with high precision in real time, so as to meet the eyeball foveated rendering requirements of the user.

SUMMARY

In view of the above problem, embodiments of the present disclosure provide a foveated rendering method and system of a VR system based on monocular eyeball tracking, which can solve the problems that since two eyeball tracking modules are respectively arranged on left and right eye positions of a screen of an integrated VR device and the same light source is adopted in the two eyeball tracking modules, when in calibration or use, light rays emitted by the light sources in the two eyeball tracking modules are likely to interfere with each other, especially for a user wearing myopia glasses, computing result errors are increased, and the position accuracy of eyeball tracking is influenced.

A foveated rendering method of a VR system based on monocular eyeball tracking provided by an embodiment of the present disclosure includes:

obtaining a first monocular mapping position, corresponding to a monocular eyeball of a user, on a display screen of the VR system;

obtaining an Inter Pupilary Distance (IPD) corresponding to a binocular pupil distance of the user, and calculating a second monocular mapping position, corresponding to the other monocular eyeball of the user, on the display screen of the VR system according to the IPD and the first monocular mapping position;

determining main rendering regions by taking the first monocular mapping position and the second monocular mapping position as circle centers and preset thresholds as radiuses respectively; and performing main rendering in the main rendering regions, and performing matched rendering on regions except the main rendering regions in the display screen of the VR system, a rendering resolution of the main rendering being higher than a rendering resolution of the matched rendering.

In at least one exemplary embodiment, the operation of obtaining a first monocular mapping position, corresponding to a monocular eyeball of a user, on a display screen of the VR system includes:

emitting light to the monocular eyeball of the user; and capturing light reflected by the monocular eyeball of the user, and obtaining the first monocular mapping position, corresponding to the monocular eyeball of the user, on the display screen of the VR system according to a relative position of the reflected light through a computer vision technology.

In at least one exemplary embodiment, the light is infrared light or visible light.

In at least one exemplary embodiment, in a case where the light is infrared light, at least one infrared light emitting source assembly emits infrared light, and an infrared light tracking camera captures infrared light reflected by the monocular eyeball of the user, and obtains the first monocular mapping position, corresponding to the monocular eyeball of the user, on the display screen of the VR system according to a relative position of the reflected infrared light through the computer vision technology.

In at least one exemplary embodiment, the infrared light tracking camera is arranged at a position corresponding to the monocular eyeball of the user in the integrated VR device, and the at least one infrared light emitting source assembly is arranged on the periphery of the infrared light tracking camera.

In at least one exemplary embodiment, when the infrared light tracking camera tracks a position of the monocular eyeball of the user, the infrared light tracking camera captures an infrared tracking image formed by the reflected infrared light of the at least one infrared light emitting source assembly on the monocular eyeball, and obtains the first monocular mapping position, corresponding to the monocular eyeball of the user, on the display screen of the VR system through the computer vision technology.

In at least one exemplary embodiment, in a case where the light is visible light, at least one visible light source assembly emits visible light, and a visible light tracking camera captures visible light reflected by the monocular eyeball of the user, and obtains the first monocular mapping position, corresponding to the monocular eyeball of the user, on the display screen of the VR system according to a relative position of the reflected visible light through the computer vision technology.

In at least one exemplary embodiment, the visible light tracking camera is arranged at a position corresponding to the monocular eyeball of the user in an integrated VR device, and the at least one visible light source assembly is arranged on the periphery of the visible light tracking camera.

In at least one exemplary embodiment, the visible light tracking camera is arranged at a position corresponding to the monocular eyeball of the user in the integrated VR device, and the at least one visible light source assembly is arranged on the periphery of the visible light tracking camera.

In at least one exemplary embodiment, the operation of obtaining an IPD corresponding to a binocular pupil distance of the user includes: adapting an IPD adjusting function module in an integrated VR device to both eyes of the user so as to obtain the IPD corresponding to the binocular pupil distance of the user.

An embodiment of the present disclosure provides a foveated rendering system of a VR system based on monocular eyeball tracking, configured to implement the foregoing foveated rendering method of the VR system based on monocular eyeball tracking. The foveated rendering system includes: a display screen, arranged in an integrated VR device, of the VR system, a monocular tracking module arranged in the integrated VR device, an IPD adjusting function module, a processor, and a rendering module.

The monocular tracking module is configured to obtain a first monocular mapping position, corresponding to a monocular eyeball of a user, on a display screen of the VR system.

The IPD adjusting function module is configured to be adapted to both eyes of the user so as to obtain the IPD corresponding to the binocular pupil distance of the user.

The processor is configured to calculate a second monocular mapping position, corresponding to the other monocular eyeball of the user, on the display screen of the VR system according to the IPD and the first monocular mapping position, and determine main rendering regions by taking the first monocular mapping position and the second monocular mapping position as circle centers and preset thresholds as radiuses respectively.

The rendering module is configured to perform main rendering in the main rendering regions, and perform matched rendering on regions except the main rendering regions in the display screen of the VR system. A rendering resolution of the main rendering is higher than a rendering resolution of the matched rendering.

In at least one exemplary embodiment, the monocular tracking module is an infrared tracking module or a visible light tracking module.

In at least one exemplary embodiment, the infrared tracking module includes at least one infrared light emitting source assembly and an infrared light tracking camera.

The at least one infrared light emitting source assembly is configured to emit infrared light.

The infrared light tracking camera is configured to capture infrared light reflected by the monocular eyeball of the user, and obtain the first monocular mapping position, corresponding to the monocular eyeball of the user, on the display screen of the VR system according to a relative position of the reflected infrared light through a computer vision technology.

In at least one exemplary embodiment, the infrared light tracking camera is arranged at a position corresponding to the monocular eyeball of the user in the integrated VR device.

The at least one infrared light emitting source assembly is arranged on the periphery of the infrared light tracking camera.

In at least one exemplary embodiment, when the infrared light tracking camera tracks a position of the monocular eyeball of the user, the infrared light tracking camera is configured to capture an infrared tracking image formed by the reflected infrared light of the at least one infrared light emitting source assembly on the monocular eyeball, and obtain the first monocular mapping position, corresponding to the monocular eyeball of the user, on the display screen of the VR system through the computer vision technology.

In at least one exemplary embodiment, the visible light tracking module includes at least one visible light source assembly and a visible light tracking camera.

The at least one visible light source assembly is configured to emit visible light.

The visible light tracking camera is configured to capture visible light reflected by the monocular eyeball of the user, and obtain the first monocular mapping position, corresponding to the monocular eyeball of the user, on the display screen of the VR system according to a relative position of the reflected visible light through the computer vision technology.

In at least one exemplary embodiment, the visible light tracking camera is arranged at a position corresponding to the monocular eyeball of the user in the integrated VR device.

The at least one visible light source assembly is arranged on the periphery of the visible light tracking camera.

In at least one exemplary embodiment, trackable light of the visible light tracking camera is in a band range of 400-900 nm.

In at least one exemplary embodiment, when the visible light tracking camera tracks a position of the monocular eyeball of the user, the visible light tracking camera is configured to capture a tracking image formed by the reflected visible light of the at least one visible light source assembly on the monocular eyeball, and obtain the first monocular mapping position, corresponding to the monocular eyeball of the user, on the display screen of the VR system through the computer vision technology.

An embodiment of the present invention provides a non-transitory computer-readable storage medium, having a computer program stored thereon which, when executed by a processor, implements the method described in any one of the foregoing embodiments or exemplary embodiments.

As can be seen from the above technical solution, according to the foveated rendering method and system of the VR system based on monocular eyeball tracking provided by the embodiments of the present disclosure, a first monocular mapping position, corresponding to a monocular eyeball of a user, on a display screen of the VR system is obtained, and then an IPD corresponding to a binocular pupil distance of the user is obtained, so as to calculate a second monocular mapping position, corresponding to the other monocular eyeball of the user, on the display screen of the VR system according to the IPD and the first monocular mapping position. Then, main rendering regions are determined by taking the first monocular mapping position and the second monocular mapping position as circle centers and preset thresholds as radiuses respectively. High-resolution main rendering is performed in the main rendering regions, and matched rendering is performed on regions except the main rendering regions in the display screen of the VR system, so that a high image definition is presented for both eyes of a user, and user experience is improved. Moreover, the problems that light rays emitted by light sources in binocular eyeball tracking are likely to interfere with each other, calculation result errors are large and the position accuracy of eyeball tracking is influenced can be solved by monocular eyeball tracking. Moreover, high-precision tracking is performed on regions of the eyes of the user in real time, and the requirements of eyeball foveated rendering of the user are greatly met.

BRIEF DESCRIPTION OF THE DRAWINGS

Other objects and results of the present disclosure will become more apparent and appreciated by reference to the following description taken in conjunction with the accompanying drawings, and as the disclosure becomes more fully understood. In the drawings.

DETAILED DESCRIPTION OF THE EMBODIMENTS

In some scenarios, the requirements on quality parameters, such as image definition, of rendered contents presented by an integrated VR device are relatively high. If a binocular tracking technology is adopted, eyeball fixation positions corresponding to binocular eyeball positions on a display screen region are obtained, contents of regions corresponding to the eyeball fixation positions are rendered at high resolution, and contents of other regions are rendered and processed at low resolution. In this way, the problem of display definition of virtual contents of an eyeball fixation region of a user is solved to a certain extent. However, according to an eyeball tracking technology which is mainstream on the integrated VR device, two eyeball tracking modules need to be respectively arranged on left and right eye positions of a screen of an integrated VR device, and the same light source needs to be adopted in the two eyeball tracking modules, so that when in calibration or use, light rays emitted by the light sources in the two eyeball tracking modules are likely to interfere with each other, especially for a user wearing myopia glasses, computing result errors are increased, and the position accuracy of eyeball tracking is influenced.

The embodiments of the present disclosure provide a foveated rendering method and system of a VR system based on monocular eyeball tracking which can solve the above problems. Exemplary embodiments of the present disclosure are described in detail below with reference to the accompanying drawings.

Figure 1:
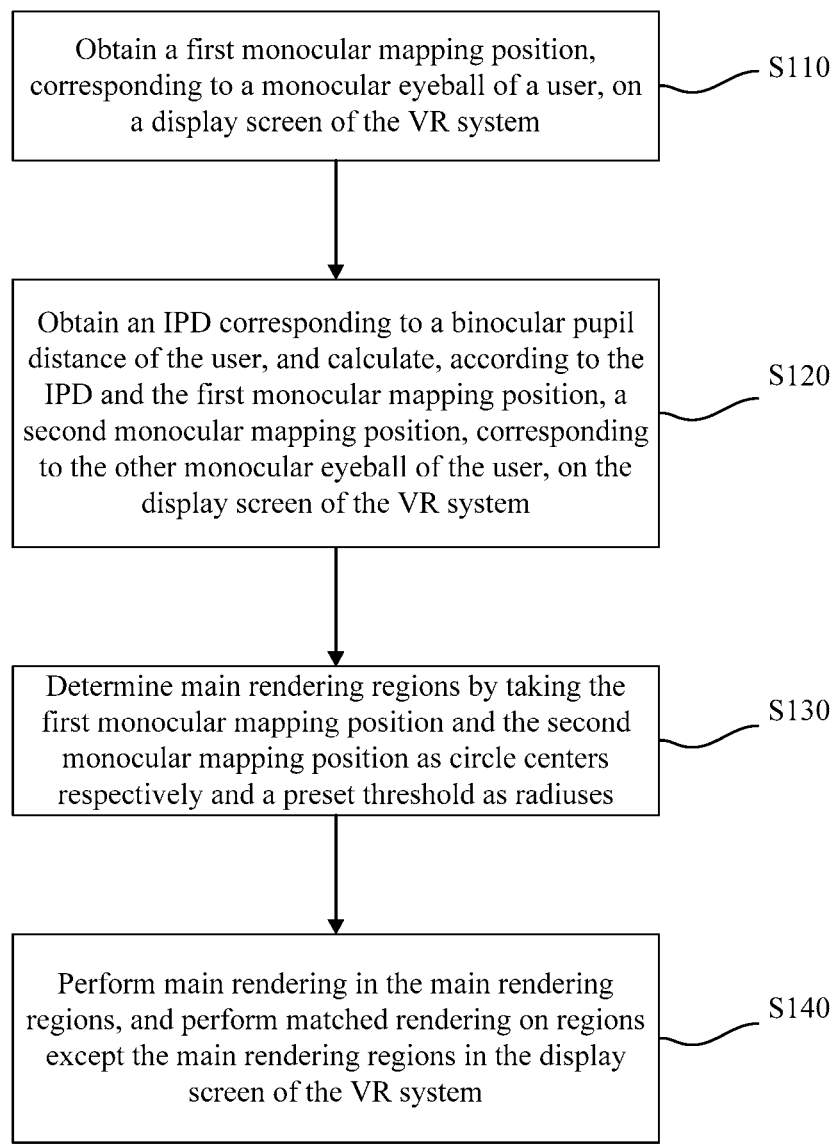
FIG. 1 is a flowchart of a foveated rendering method of a VR system based on monocular eyeball tracking according to an embodiment of the present disclosure.
Figure 2:
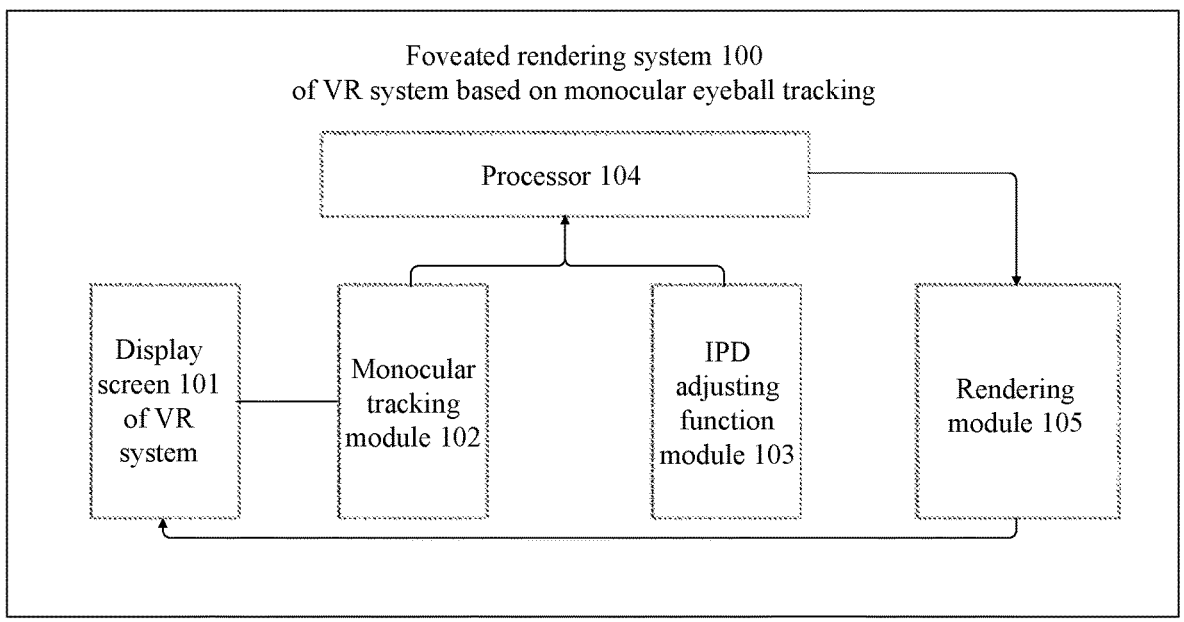
FIG. 2 is a schematic diagram of a foveated rendering system of a VR system based on monocular eyeball tracking according to an embodiment of the present disclosure.

In order to illustrate the foveated rendering method and system of a VR system based on monocular eyeball tracking provided by the embodiment of the present disclosure, FIG. 1 exemplarily illustrates a foveated rendering method of a VR system based on monocular eyeball tracking according to an embodiment of the present disclosure, and FIG. 2 exemplarily illustrates a foveated rendering system of a VR system based on monocular eyeball tracking according to an embodiment of the present disclosure.

The following description of the exemplary embodiments is only illustrative, and is not used as any limitation for the present disclosure and the application or use of the present disclosure. Technologies and devices known by those having ordinary skill in the related art may not be discussed in detail. However, where appropriate, the technologies and the devices shall be regarded as part of the description.

As shown in FIG. 1, a foveated rendering method of a VR system based on monocular eyeball tracking provided by an embodiment of the present disclosure includes the following operations.

At S110, a first monocular mapping position, corresponding to a monocular eyeball of a user, on a display screen of the VR system is obtained.

At S120, an IPD corresponding to a binocular pupil distance of the user is obtained, and a second monocular mapping position, corresponding to the other monocular eyeball of the user, on the display screen of the VR system is calculated according to the IPD and the first monocular mapping position.

At S130, main rendering regions are determined by taking the first monocular mapping position and the second monocular mapping position as circle centers and preset thresholds as radiuses respectively.

At S140, main rendering is performed in the main rendering regions, and matched rendering is performed on regions except the main rendering regions in the display screen of the VR system. A rendering resolution of the main rendering is higher than a rendering resolution of the matched rendering.

As shown in FIG. 1, the process that a first monocular mapping position, corresponding to a monocular eyeball of a user, on a display screen of the VR system is obtained in operation S110 includes the following operations.

At S11, light is emitted to the monocular eyeball of the user. The light may be infrared light or visible light. The monocular eyeball may be a left eye or a right eye.

At S12, light reflected by the monocular eyeball of the user is captured, and the first monocular mapping position, corresponding to the monocular eyeball of the user, on the display screen of the VR system is obtained according to a relative position of the reflected infrared light through a computer vision technology.

As described above, according to the foveated rendering method of the VR system based on monocular eyeball tracking provided by the present disclosure, a first monocular mapping position, corresponding to a monocular eyeball of a user, on a display screen of the VR system is obtained, and then an IPD corresponding to a binocular pupil distance of the user is obtained, so as to calculate a second monocular mapping position, corresponding to the other monocular eyeball of the user, on the display screen of the VR system according to the IPD and the first monocular mapping position. Then, main rendering regions are determined by taking the first monocular mapping position and the second monocular mapping position as circle centers and preset thresholds as radiuses respectively. High-resolution main rendering is performed in the main rendering regions, and matched rendering is performed on regions except the main rendering regions in the display screen of the VR system, so that a high image definition is presented for both eyes of a user, and user experience is improved. Moreover, the problems that light rays emitted by light sources in binocular eyeball tracking are likely to interfere with each other, calculation result errors are large and the position accuracy of eyeball tracking is influenced can be solved by monocular eyeball tracking. Moreover, high-precision tracking is performed on regions of the eyes of the user in real time, and the requirements of eyeball foveated rendering of the user are greatly met.

As shown in FIG. 2, the embodiment of the present disclosure provides a foveated rendering system 100 of a VR system based on monocular eyeball tracking. The foveated rendering system 100 is configured to implement the foregoing foveated rendering method of the VR system based on monocular eyeball tracking, and includes: a display screen 101 of the VR system arranged in an integrated VR device, a monocular tracking module 102 arranged in the integrated VR device, an IPD adjusting function module 103, a processor 104, and a rendering module 105.

The monocular tracking module 102 is configured to obtain a first monocular mapping position, corresponding to a monocular eyeball of a user, on a display screen 101 of the VR system.

The IPD adjusting function module 103 is configured to be adapted to both eyes of the user so as to obtain the IPD corresponding to the binocular pupil distance of the user. In the present embodiment, the IPD adjusting function module 103 is arranged in the integrated VR device. The user can adjust an IPD value (Inter Pupilary Distance) suitable for the binocular pupil distance of the user according to the binocular pupil distance of the user, so that a distance between two cylindrical lenses of the integrated VR device is matched with the binocular pupil distance of the user.

The processor 104 is configured to calculate a second monocular mapping position, corresponding to the other monocular eyeball of the user, on the display screen of the VR system according to the IPD and the first monocular mapping position, and determine main rendering regions by taking the first monocular mapping position and the second monocular mapping position as circle centers and preset thresholds as radiuses respectively. The preset threshold is not specifically limited in the present embodiment, and is adjustable according to specific application conditions.

The rendering module 105 is configured to perform main rendering in the main rendering regions, and perform matched rendering on regions except the main rendering regions in the display screen of the VR system. A rendering resolution of the main rendering is higher than a rendering resolution of the matched rendering. Therefore, contents of regions corresponding to the eyeball fixation positions are rendered at high resolution, and contents of other regions are rendered and processed at low resolution. The overall calculation speed is increased, high-precision tracking is performed on a binocular position region of the user in real time, and the requirements of eyeball foveated rendering of the user are met to a great extent.

In the embodiment shown in FIG. 2, the monocular tracking module 102 is an infrared tracking module A or a visible light tracking module B.

If the infrared tracking module A is adopted, the infrared tracking module A includes at least one infrared light emitting source assembly A-1 and an infrared light tracking camera A-2.

The at least one infrared light emitting source assembly A-1 is configured to emit infrared light.

The infrared light tracking camera A-2 is configured to capture infrared light reflected by the monocular eyeball of the user, and obtain the first monocular mapping position, corresponding to the monocular eyeball of the user, on the display screen of the VR system according to a relative position of the reflected infrared light through a computer vision technology.

In the present embodiment, an infrared light tracking camera is adopted, and the infrared light tracking camera is arranged at a position corresponding to the monocular eyeball of the user in the integrated VR device. The at least one infrared light emitting source assembly is arranged on the periphery of the infrared light tracking camera. That is, a certain number of infrared light emitting source assemblies are arranged near the periphery of the infrared light tracking camera. For example, the monocular eyeball of the user is the right eye. When the infrared light tracking camera tracks a position of the monocular eyeball of the user, an infrared tracking image formed by the reflected infrared light of the at least one infrared light emitting source assembly on the monocular eyeball is captured, and then position information corresponding to the eyeball position on the right eye screen is obtained through a computer vision technology.

If the visible light tracking module B is adopted, the visible light tracking module B includes at least one visible light source assembly B-1 and a visible light tracking camera B-2.

The at least one visible light source assembly B-1 is configured to emit visible light.

The visible light tracking camera B-2 is configured to capture visible light reflected by the monocular eyeball of the user, and obtain the first monocular mapping position, corresponding to the monocular eyeball of the user, on the display screen of the VR system according to a relative position of the reflected visible light through the computer vision technology.

In the present embodiment, a visible light tracking camera B-2 is arranged. The visible light tracking camera B-2 may be a color camera or a monochrome gray scale camera. The visible light tracking camera B-2 is arranged at a position corresponding to the monocular eyeball of the user in the integrated VR device, and trackable light of the visible light tracking camera is in a band range of 400-900 nm. The at least one visible light source assembly B-1 is arranged on the periphery of the visible light tracking camera. That is, a certain number of visible light source assemblies B-1 are provided near the periphery of the visible light tracking camera. The at least one visible light source assembly B-1 not only includes visible light, but also includes any light source assembly whose light can be captured by the visible light tracking camera B-2. A band of the at least one visible light source assembly B-1 is 400-900 nm. The at least one visible light source assembly may be at least one visible light source assembly in a traditional sense, and may also be at least one infrared light emitting source assembly with a band of 850 nm. For example, the monocular eyeball of the user is the right eye. When the visible light tracking camera tracks the eyeball position of the user, a tracking image formed by the reflected visible light of the at least one visible light source assembly on the monocular eyeball is captured, and then position information corresponding to the eyeball position on the right eye screen is obtained through a computer vision technology.

As can be seen from the above implementation mode, according to the foveated rendering system of the VR system based on monocular eyeball tracking provided by the present disclosure, a first monocular mapping position, corresponding to a monocular eyeball of a user, on a display screen of the VR system is obtained, and then an IPD corresponding to a binocular pupil distance of the user is obtained, so as to calculate a second monocular mapping position, corresponding to the other monocular eyeball of the user, on the display screen of the VR system according to the IPD and the first monocular mapping position. Then, main rendering regions are determined by taking the first monocular mapping position and the second monocular mapping position as circle centers and preset thresholds as radiuses respectively. High-resolution main rendering is performed in the main rendering regions, and matched rendering is performed on regions except the main rendering regions in the display screen of the VR system, so that a high image definition is presented for both eyes of a user, and user experience is improved. Moreover, the problems that light rays emitted by light sources in binocular eyeball tracking are likely to interfere with each other, calculation result errors are large and the position accuracy of eyeball tracking is influenced can be solved by monocular eyeball tracking. Moreover, high-precision tracking is performed on regions of the eyes of the user in real time, and the requirements of eyeball foveated rendering of the user are greatly met.

The foveated rendering method and system of the VR system based on monocular eyeball tracking proposed according to the embodiments of the present disclosure is described above by way of example with reference to the accompanying drawings. However, those having ordinary skill in the art should understand that various improvements can be made to the foveated rendering method and system of the VR system based on monocular eyeball tracking proposed in the embodiments of the present disclosure, without departing from the content of the present disclosure. Therefore, the scope of protection of the present disclosure should be determined by the content of the appended claims.

What is claimed is:

1. A foveated rendering method of a Virtual Reality (VR) system, comprising:
   obtaining a first monocular mapping position, corresponding to a monocular eyeball of a user, on a display screen of the VR system;
   obtaining an Inter Pupilary Distance (IPD) of the user, and calculating a second monocular mapping position, corresponding to the other monocular eyeball of the user, on the display screen of the VR system according to the IPD and the first monocular mapping position;
   determining main rendering regions by taking the first monocular mapping position and the second monocular mapping position as circle centers and preset thresholds as radiuses respectively; and
   performing main rendering in the main rendering regions, and performing matched rendering on regions except the main rendering regions in the display screen of the VR system, wherein a rendering resolution of the main rendering is higher than a rendering resolution of the matched rendering.

2. The foveated rendering method of the VR system according to claim 1, wherein obtaining a first monocular mapping position, corresponding to a monocular eyeball of a user, on a display screen of the VR system comprises:
   emitting light to the monocular eyeball of the user; and
   capturing light reflected by the monocular eyeball of the user, and obtaining the first monocular mapping position according to a relative position of the reflected light through a computer vision technology.

3. The foveated rendering method of the VR system according to claim 2, wherein the light is infrared light or visible light.

4. The foveated rendering method of the VR system according to claim 3, wherein in a case where the light is infrared light,
   at least one infrared light emitting source assembly emits infrared light; and
   an infrared light tracking camera captures infrared light reflected by the monocular eyeball of the user, and obtains the first monocular mapping position according to a relative position of the reflected infrared light through the computer vision technology.

5. The foveated rendering method of the VR system according to claim 4, wherein
   the infrared light tracking camera is arranged at a position corresponding to the monocular eyeball of the user in an integrated VR device; and
   the at least one infrared light emitting source assembly is arranged on the periphery of the infrared light tracking camera.

6. The foveated rendering method of the VR system according to claim 4, wherein when the infrared light tracking camera tracks a position of the monocular eyeball of the user, the infrared light tracking camera captures an infrared tracking image formed by the reflected infrared light of the at least one infrared light emitting source assembly on the monocular eyeball, and obtains the first monocular mapping position through the computer vision technology.

7. The foveated rendering method of the VR system according to claim 3, wherein in a case where the light is visible light,
   at least one visible light source assembly emits visible light; and
   a visible light tracking camera captures visible light reflected by the monocular eyeball of the user, and obtains the first monocular mapping position according to a relative position of the reflected visible light through the computer vision technology.

8. The foveated rendering method of the VR system according to claim 7, wherein
   the visible light tracking camera is arranged at a position corresponding to the monocular eyeball of the user in an integrated VR device; and
   the at least one visible light source assembly is arranged on the periphery of the visible light tracking camera.

9. The foveated rendering method of the VR system according to claim 7, wherein when the visible light tracking camera tracks a position of the monocular eyeball of the user, the visible light tracking camera captures a tracking image formed by the reflected visible light of the at least one visible light source assembly on the monocular eyeball, and obtains the first monocular mapping position, corresponding to the monocular eyeball of the user, on the display screen of the VR system through the computer vision technology.

10. The foveated rendering method of the VR system according to claim 2, wherein obtaining an IPD of the user comprises:
    adapting an IPD adjusting function module in an integrated VR device to both eyes of the user so as to obtain the IPD of the user.

11. A foveated rendering system of a Virtual Reality (VR) system, the foveated rendering system comprising: a display screen, arranged in an integrated VR device, of the VR system, a monocular tracking module arranged in the integrated VR device, an Inter Pupilary Distance (IPD) adjusting function module, a processor, and a rendering module, wherein
    the monocular tracking module is configured to obtain a first monocular mapping position, corresponding to a monocular eyeball of a user, on a display screen of the VR system;
    the IPD adjusting function module is configured to be adapted to both eyes of the user so as to obtain the IPD of the user;
    the processor is configured to calculate a second monocular mapping position, corresponding to the other monocular eyeball of the user, on the display screen of the VR system according to the IPD and the first monocular mapping position, and determine main rendering regions by taking the first monocular mapping position and the second monocular mapping position as circle centers and preset thresholds as radiuses respectively; and
    the rendering module is configured to perform main rendering in the main rendering regions, and perform matched rendering on regions except the main rendering regions in the display screen of the VR system, wherein a rendering resolution of the main rendering is higher than a rendering resolution of the matched rendering.

12. The foveated rendering system of the VR system according to claim 11, wherein
    the monocular tracking module is an infrared tracking module or a visible light tracking module.

13. The foveated rendering system of the VR system according to claim 12, wherein
    the infrared tracking module comprises at least one infrared light emitting source assembly and an infrared light tracking camera, wherein
    the at least one infrared light emitting source assembly is configured to emit infrared light; and
    the infrared light tracking camera is configured to capture infrared light reflected by the monocular eyeball of the user, and obtain the first monocular mapping position according to a relative position of the reflected infrared light through a computer vision technology.

14. The foveated rendering system of the VR system according to claim 13, wherein
    the infrared light tracking camera is arranged at a position corresponding to the monocular eyeball of the user in the integrated VR device; and
    the at least one infrared light emitting source assembly is arranged on the periphery of the infrared light tracking camera.

15. The foveated rendering system of the VR system according to claim 13, wherein when the infrared light tracking camera tracks a position of the monocular eyeball of the user, the infrared light tracking camera is configured to capture an infrared tracking image formed by the reflected infrared light of the at least one infrared light emitting source assembly on the monocular eyeball, and obtain the first monocular mapping position through the computer vision technology.

16. The foveated rendering system of the VR system according to claim 12, wherein
    the visible light tracking module comprises at least one visible light source assembly and a visible light tracking camera,
    wherein the at least one visible light source assembly is configured to emit visible light; and
    the visible light tracking camera is configured to capture visible light reflected by the monocular eyeball of the user, and obtain the first monocular mapping position according to a relative position of the reflected visible light through a computer vision technology.

17. The foveated rendering system of the VR system according to claim 16, wherein
    the visible light tracking camera is arranged at a position corresponding to the monocular eyeball of the user in the integrated VR device; and
    the at least one visible light source assembly is arranged on the periphery of the visible light tracking camera.

18. The foveated rendering system of the VR system according to claim 17, wherein
    trackable light of the visible light tracking camera is in a band range of 400-900 nm.

19. The foveated rendering system of the VR system according to claim 16, wherein when the visible light tracking camera tracks a position of the monocular eyeball of the user, the visible light tracking camera is configured to capture a tracking image formed by the reflected visible light of the at least one visible light source assembly on the monocular eyeball, and obtain the first monocular mapping position through the computer vision technology.

20. A non-transitory computer-readable storage medium, having a computer program stored thereon which, when executed by a processor, implements the method according to claim 1.

* * * * *